US008972389B2

United States Patent
Kritt et al.

(10) Patent No.: US 8,972,389 B2
(45) Date of Patent: Mar. 3, 2015

(54) USE OF ONTOLOGY TO FIND A CATEGORY OF A SELECTED KEYWORD IN A WEBPAGE

(71) Applicant: International Business Machines Corporation, Armonk, NY (US)

(72) Inventors: Barry A. Kritt, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 13/652,985

(22) Filed: Oct. 16, 2012

(65) Prior Publication Data

US 2014/0108385 A1    Apr. 17, 2014

(51) Int. Cl.
*G06F 17/30* (2006.01)

(52) U.S. Cl.
CPC .......... *G06F 17/30* (2013.01); *G06F 17/30705* (2013.01)
USPC ............................ 707/723; 707/736; 707/739

(58) Field of Classification Search
CPC ...................... G06F 17/30705; G06F 17/30864
USPC .......... 707/739, 736, 723, 748, 735, E17.082; 718/106; 719/318
See application file for complete search history.

(56) References Cited

U.S. PATENT DOCUMENTS

| 7,657,546 | B2 | 2/2010 | Goodwin et al. | |
|---|---|---|---|---|
| 8,041,702 | B2 | 10/2011 | Eggebraaten et al. | |
| 2003/0120681 | A1* | 6/2003 | Baclawski | 707/103 R |
| 2006/0074980 | A1* | 4/2006 | Sarkar | 707/104.1 |
| 2007/0174270 | A1 | 7/2007 | Goodwin et al. | |
| 2007/0250901 | A1* | 10/2007 | McIntire et al. | 725/146 |
| 2008/0253283 | A1* | 10/2008 | Douglis et al. | 370/228 |
| 2008/0256167 | A1* | 10/2008 | Branson et al. | 709/201 |
| 2008/0256548 | A1* | 10/2008 | Branson et al. | 718/106 |
| 2008/0256549 | A1* | 10/2008 | Liu et al. | 718/106 |
| 2009/0222400 | A1* | 9/2009 | Kupershmidt et al. | 706/52 |
| 2010/0070448 | A1* | 3/2010 | Omoigui | 706/47 |
| 2010/0293125 | A1* | 11/2010 | Simmons et al. | 706/45 |
| 2010/0318929 | A1* | 12/2010 | Hilton et al. | 715/769 |
| 2012/0166373 | A1* | 6/2012 | Sweeney et al. | 706/14 |
| 2012/0227077 | A1* | 9/2012 | Spivack et al. | 725/110 |
| 2013/0066823 | A1* | 3/2013 | Sweeney et al. | 706/50 |

OTHER PUBLICATIONS

Y Ren, JZ Pan, Y Zhao—Proc. of IWOD, 2010—homepages.abdn.ac.uk—"Towards scalable reasoning on ontology streams via syntactic approximation" (pp. 1-15).*

(Continued)

*Primary Examiner* — Anh Ly
(74) *Attorney, Agent, or Firm* — Lieberman & Brandsdorfer, LLC (57) ABSTRACT

Embodiments are provided for displaying ontology data. An ontology is displayed for a selected item. The ontology presents representational elements associated with the selected item, a combination of the representational elements defining and/or establishing a context for the selected item. The representational elements are categorized on a hierarchical path, the elements ordered by scope size. The ontology can be navigated in multiple directions with the directions including items broader in scope, and items narrower in scope. Navigating in one of these directions includes a displayed representational element from the ontology having a scope size reflecting the navigated direction.

13 Claims, 6 Drawing Sheets

(56) References Cited

OTHER PUBLICATIONS

Yuan Ren: University of Aberdeen, Aberdeen, United Kingdom; Jeff Z. Pan: University of Aberdeen, Aberdeen, United Kingdom—"Optimising ontology stream reasoning with truth maintenance system" Proceeding CIKM '11 Proceedings of the 20th ACM international conference on Information and knowledge management—pp. 831-836.*

Anonymous, System and Method of Searching keywords from Serial Web Pages, ip.com Prior Art Database, Feb. 22, 2012.

Anonymous, Ontology As Basis of a Domain-Specific Language With Integrated Development Environment, ip.com Prior Art Database, Mar. 9, 2011.

Kwong et al., Performing Binary-Categorzation on Multiple-Record Web Documents Using Information Retrieval Models and Application Ontologies, Sep. 2003.

* cited by examiner

USE OF ONTOLOGY TO FIND A CATEGORY OF A SELECTED KEYWORD IN A WEBPAGE

BACKGROUND

1. Technical Field

The present invention relates to electronic item clarification. More specifically, the invention relates to a system, method and computer program that displays hierarchical ontology data associated with a select item.

2. Description of the Prior Art

Searching words, terms, or phrases for a definition or further clarification in an electronic medium has become commonplace. Online dictionaries or encyclopedias are used to search for terms within a source where a user requires a further explanation of a less familiar term. Applications exist where a word can be searched within a source, often by right clicking on a target word. These applications may have a built in thesaurus or dictionary as a reference aid.

Unknown keywords and many proper nouns however, cannot be searched due to their specific nature. These terms must be searched outside the application, and can slow down the ability of a user to efficiently read through relevant source material. This can often frustrate a user as a source with many unknown words can take an exorbitant amount of time to read through using current search tactics.

SUMMARY OF THE INVENTION

A method, system, and computer program product are provided for hierarchically displaying ontology data associated with a selected item.

In one aspect, a method is provided for displaying ontology data. Context for a selected item is derived through items associated with the selected item. A proximity value for each element in an ontology associated with the selected item is assessed. The ontology defines a set of representational elements, each representational element categorized in the ontology according to a scope size of the representational element. The proximity value is assessed based on a contextual relationship the selected item shares with an associated element within the ontology. Each element in the ontology is ranked based on the assigned proximity value. A first element within the ontology is viewed. The first element is determined to be a highest ranked element in the ontology. Starting from the first viewed element, a hierarchical path within the ontology is navigated in one of at least two directions. The directions include an item broader in scope than the first element, or an item narrower in scope than the first element. A second element having a scope reflective of the navigated direction is viewed.

In another aspect, a computer program product is provided. The computer comprises a computer readable non-transitory storage medium having computer readable program code embodied therewith. When executed, the computer program product derives context for a selected item. More specifically, the computer program product derives the context from items associated with the first selected item. The computer program product assesses a proximity value for each item in an ontology associated with the selected item. The ontology is defined as a set of representational elements, each representational element categorized in the ontology according to a scope size of the representational element. The assessed proximity value is based on a contextual relationship the selected item shares with an associated element in the ontology. The computer program product ranks each element in the ontology based on the assigned proximity value. The computer program product displays a first element within the ontology, the first element determined to be a highest ranked element in the ontology. The computer program product represents the displayed first element on a hierarchical path to be navigated in one of at least two directions. The directions include an item broader in scope than the first element, or an item narrower in scope than the first element. The computer program product presents at least one second element having a scope reflective of the navigated direction.

In yet another aspect, a system is provided with a processing unit to support navigation of a hierarchical path within ontological data. A functional unit is provided in communication with the processing unit. The functional unit includes tools embodied therewith to support an interface representing ontological data, including an ontology manager, a representation manager, a navigation manager, and a presentation manager. The ontology manager derives context for a selected item from items associated with the selected item and extracts at least one ontology stream. The ontology stream defines a set of representational elements categorized according to a relevant quality associated with a first selected item. Each ontology stream contains a second item contextually associated with the first selected item. The representation manager is provided in communication with the ontology manager. The representation manger supports selection of at least one representational item from the at least one extracted ontology. The navigation manager is provided in communication with the representation manager, and supports navigation on at least one hierarchical path within the ontology in one of at least two directions. The navigation directions include an item broader in scope than the at least one representational item or an item narrower in scope than the at least one representational item. The navigation manager further replaces the at least one selected representational item with a different representational item corresponding to the direction of navigation on the hierarchical path. The presentation manager is provided in communication with the representation manager. The presentation manager presents the at least one representational item selected by the representation manager.

Other features and advantages of this invention will become apparent from the following detailed description of the presently preferred embodiment(s), taken in conjunction with the accompanying drawings

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

Reference made to an ontology in the described embodiments shall be understood as a set of representational elements categorized according to a relevant quality associated with an item. In one embodiment, an element may be an image or textual term having a predefined scope. These elements are categorized according to the scope of each individual element. Reference to an ontology stream should further be understood as the combination of these elements with varying scopes forming the ontology. Each ontology stream is determined to have a hierarchical path, the hierarchical path being an ontology stream organized by narrowing scope size. It should also be understood that a smaller scope is synonymous with a narrower scope and a larger scope is synonymous with a broader scope.

Figure 1:
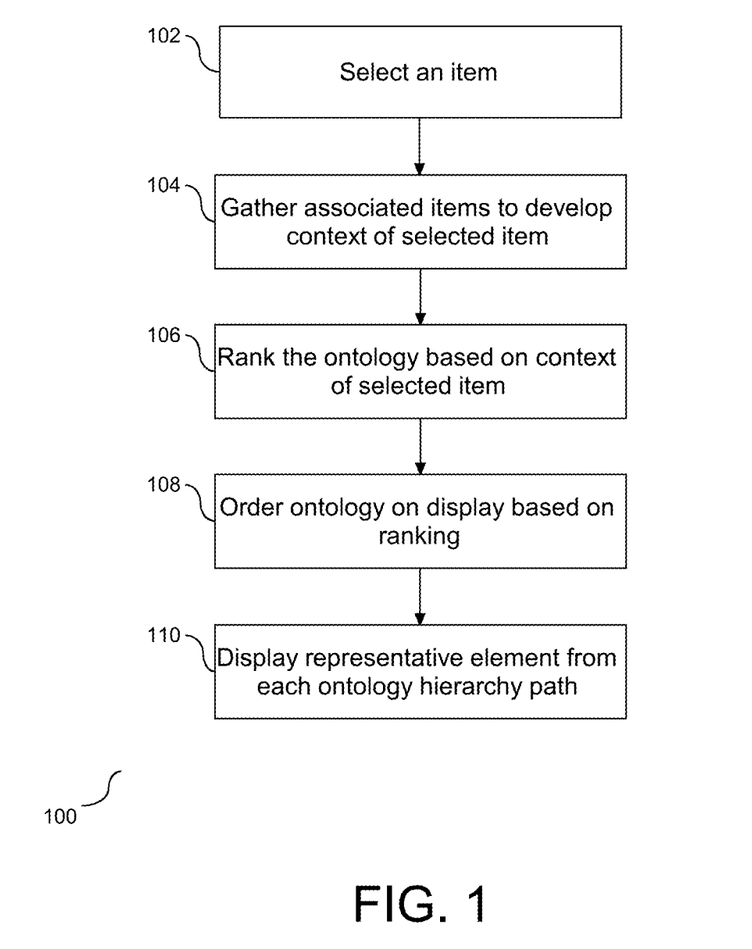
FIG. 1 depicts a flow chart illustrating a process for displaying ranked ontology streams.

An item, such as a textual term or an image, often has multiple definitions or multiple applications with regard to context. An item therefore, may be represented in more than one ontology stream having varying contextual implications. FIG. 1 is a flow chart (100) illustrating a process for displaying multiple ontology streams for a selected item (102) having multiple definitions or contextual interpretations. A context for the selected item is identified. In one embodiment, items associated with the selected item are gathered to develop a context of the selected item (104). For example, words or pictures found to be relevant on a webpage containing the selected item can be gathered and analyzed to determine the selected context of the item. In one embodiment, this determined context is used to determine which ontology stream is most relevant to the selected item. Accordingly, a selected item has identified ontology streams each varying in context.

In one embodiment, the selected item has multiple ontology streams which are ranked based on their contextual similarity to the selected item, with the ontology stream most contextually similar to the selected item given the highest ranking (106). The order to which the ontology streams are displayed corresponds to the rank of each ontology stream (108). For example, the ontology streams could be displayed in a top down stack with the most relevant ontology stream displayed at the top of the stack. Alternatively, the ontology stream most contextually similar to the selected item may be closest in proximity to the selected item upon display. In one embodiment, one representative element from the ontology stream is displayed for each displayed ontology stream (110). In this embodiment, a proximity value is assigned to each element in an ontology stream, the assigned proximity value being dependent on the contextual relationship the selected item shares with the corresponding element. Therefore, an element sharing a greater contextual relationship with the selected item will be assigned a greater proximity value. This contextual relationship can be determined based on a semantic relationship shared between the element and the selected item, and/or the similarity of scope between the element and the selected item. Each element is ranked according to the assigned proximity value such that the element with the greatest proximity value is ranked the highest. The representative element from the ontology stream displayed is the element with the highest ranking. Accordingly, ontology streams are displayed in an order of contextual relevance.

Figure 2:
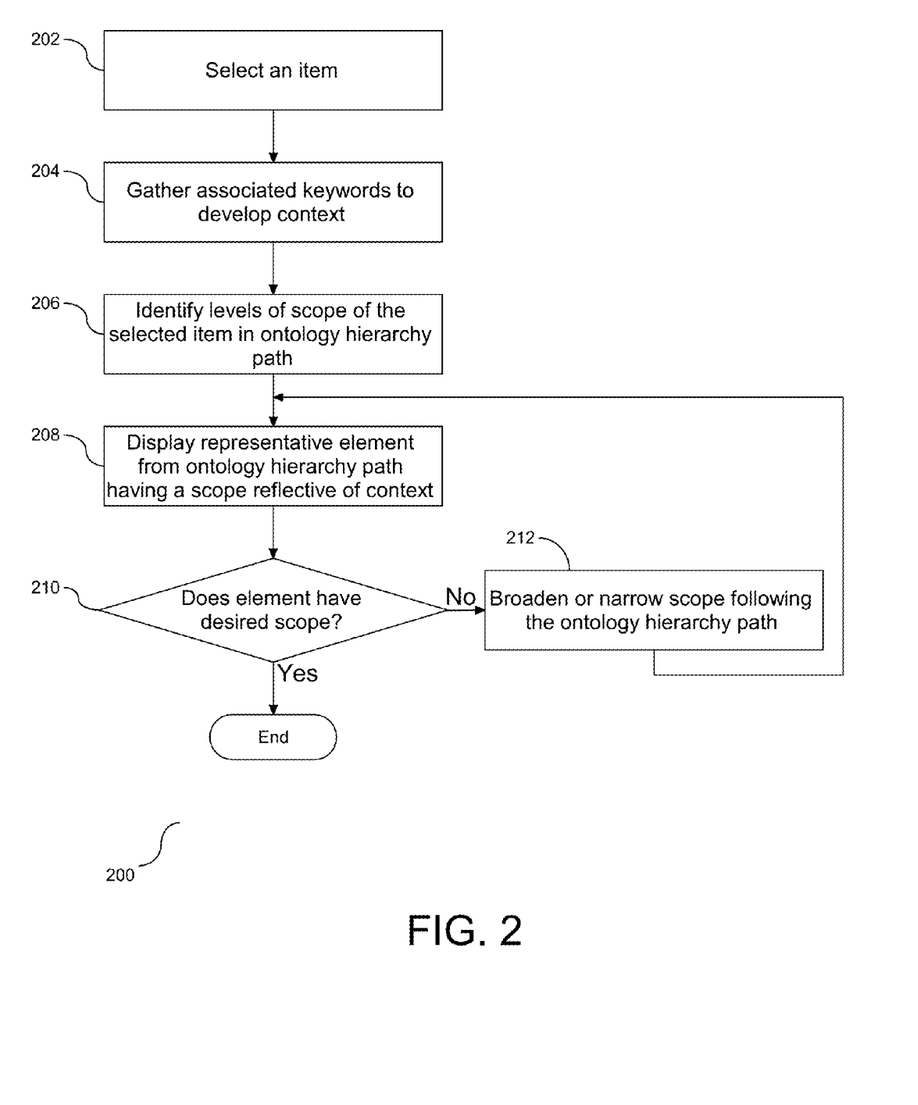
FIG. 2 depicts a flow chart illustrating a process for displaying an ontology.

Each ontology stream can be navigated along the ontology stream's hierarchy path. FIG. 2 depicts a flow chart (200) illustrating a method to display the ontology of a selected item. An item, being an image or text, is selected (202). Keywords or images associated with the selected item are gathered to develop the context of the selected item (204). The levels of scope of the selected item are identified on the ontology hierarchy path (206), and a representative element from the ontology hierarchy path is displayed. In one embodiment, the representative element determined to be displayed is the element determined to have the scope most reflective of the context of the selected item (208). In one embodiment, multiple representative elements are displayed, each representative element sharing a substantially equivalent scope size. In another embodiment, the representative element is the element within the ontology hierarchy path matching the select item. It is determined if the representative elements has a desired scope (210), for example, if the displayed elements has adequately defined the selected item for a user. If the representative element does not have the desired scope, the scope is chosen to be broadened or narrowed (212) and a new representative element from the ontology hierarchy path is displayed having the varied scope. Accordingly, the ontology hierarchy path is navigated based on scope size.

Figure 3A:
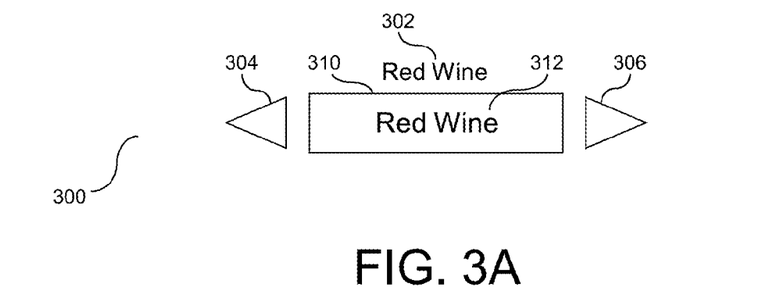
FIGS. 3A, 3B, and 3C depict block diagrams, each block diagram illustrating a display of ontology information for an example select word.

FIG. 3A is a block diagram (300) depicting an example of a display for navigating a hierarchy for a select word. In this example, a first representative element, e.g. "red wine", of the hierarchy (312) is displayed in a first view (310) adjacent to the select word (302) and in this example, is displayed directly below the select word (302). A left navigational arrow (304) and a right navigational arrow (306) are shown on either side of the first representative element (312). When activated, the navigational arrows (304) and (306) change the displayed representative element to a second representative element having a different scope than the previously displayed first representative element (312). In this example, the left navigational arrow (304) is used to change the representative element (312) to a broader scope, and the right navigational arrow (306) is used to change the representative element (312) of the hierarchy to a narrower scope. In one embodiment, an additional arrow may be displayed (not shown) to change the representative element of the hierarchy to one of like scope. Accordingly, the representative elements of the hierarchy are navigated according to scope size.

Figure 3B:
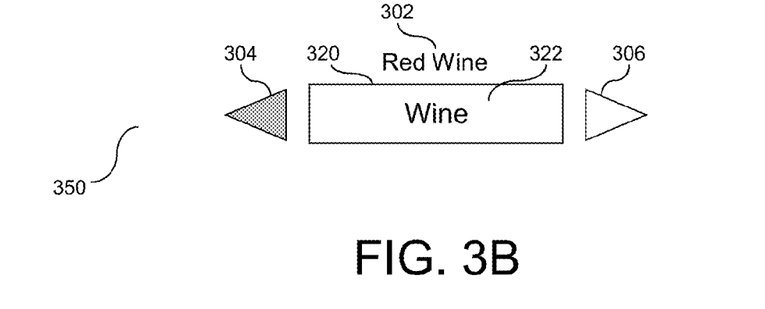

FIG. 3B is a block diagram (350) depicting an example of the display of FIG. 3A that has been navigated. A second representative element (322) is displayed in a second view (320) shown broader in scope than the first representative element (312) in response to selecting the left navigational arrow (304), as highlighted. In this example the broader second representative element (322) is "wine". It is understood that wine is broader in scope than red wine as red wine is a particular form of wine. Accordingly, the representative element is broadened in scope size through application of a navigational arrow.

Figure 3C:
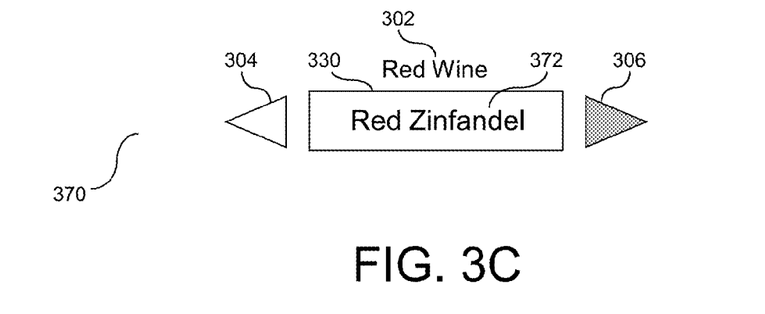

FIG. 3C is a block diagram (370) depicting an example of the display of FIG. 3A that has been navigated. A third representative element (372) is displayed in a third view (330) shown having a narrower scope than the first representative element (312) in response to selecting the right navigational arrow (306), as highlighted. In this example the narrower third representative element (372) is "Red Zinfandel", a particular form of red wine. Accordingly a representative element is narrowed in scope size through application of a navigational arrow.

Figure 4A:
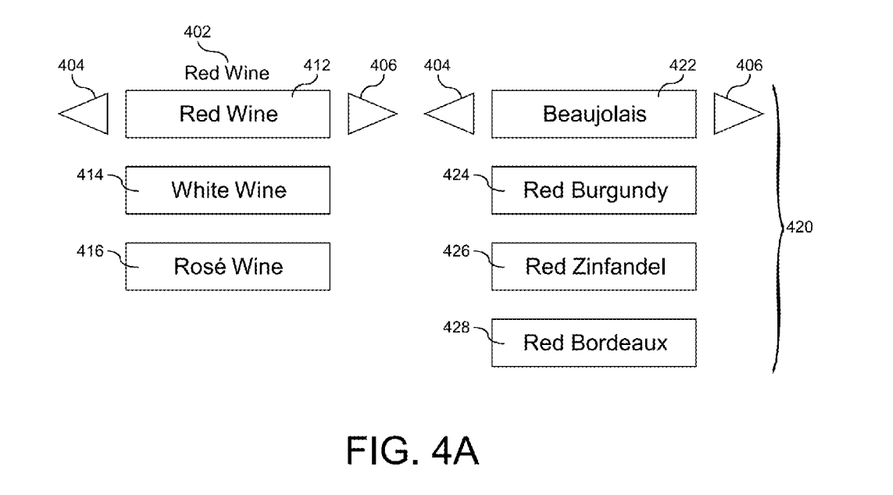
FIGS. 4A and 4B depict block diagrams, each block diagram illustrating an alternative display of ontology information for an example select word.
Figure 4B:
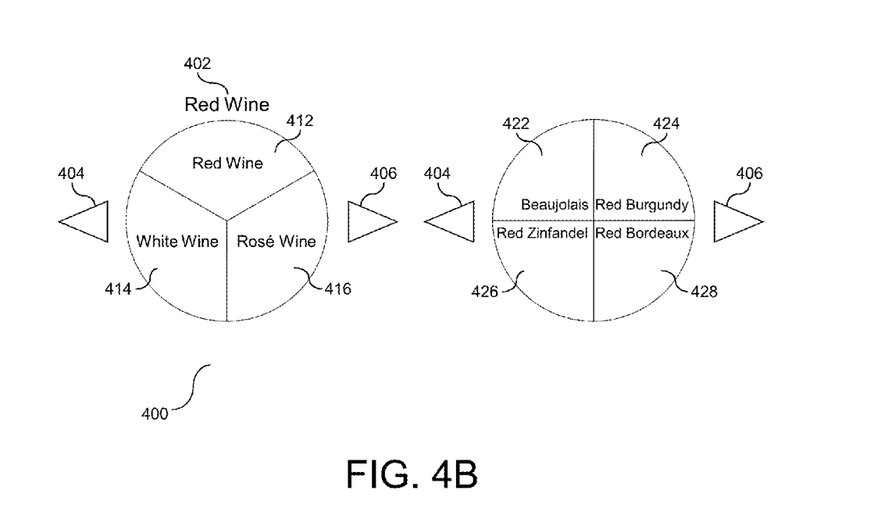

FIGS. 4A and 4B depict a block diagram showing an example for an alternative display of hierarchy elements. Multiple elements are displayed within a hierarchy in response to a selected word, the multiple elements sharing a scope level within the hierarchy. In this example, the select word (402) is "red wine" and the first displayed representative element (412), shown in a first view (410), is similarly "red wine". However it should be understood that the first representative element (412) may be a different word than the select word (402). Listed below "red wine" are examples of multiple alternative elements sharing a scope level with "red wine" (412) such as "white wine" (414), and "rosé wine" (416). As in FIGS. 3A, 3B, and 3C, a left navigational arrow (404) is used to change the representative element of the hierarchy to one of broader scope and a right navigational arrow (406) is used to change the representative element of the hierarchy to one of narrower scope. Upon selection of the right navigational arrow (406) a list of representational elements sharing a narrower scope in a second view (420) are displayed. Different arrangements may be employed to display the list of representational elements. In this example, the representational elements are linearly arranged narrower in scope as follows: "Beaujolais" (422), "Red Burgundy" (424), "Red Zinfandel" (426), and "Red Bordeaux" (428). Each of these representational elements is a particular form of the select word "red wine" (412). In one embodiment, the representational elements can be displayed in a linearly stacked arrangement, as shown in FIG. 4A. In another embodiment, the representational elements can be displayed in a non-linear arrangement, as shown in FIG. 4B, with like numbers representing like elements. Accordingly, multiple representational elements of like scope in the hierarchy may be displayed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
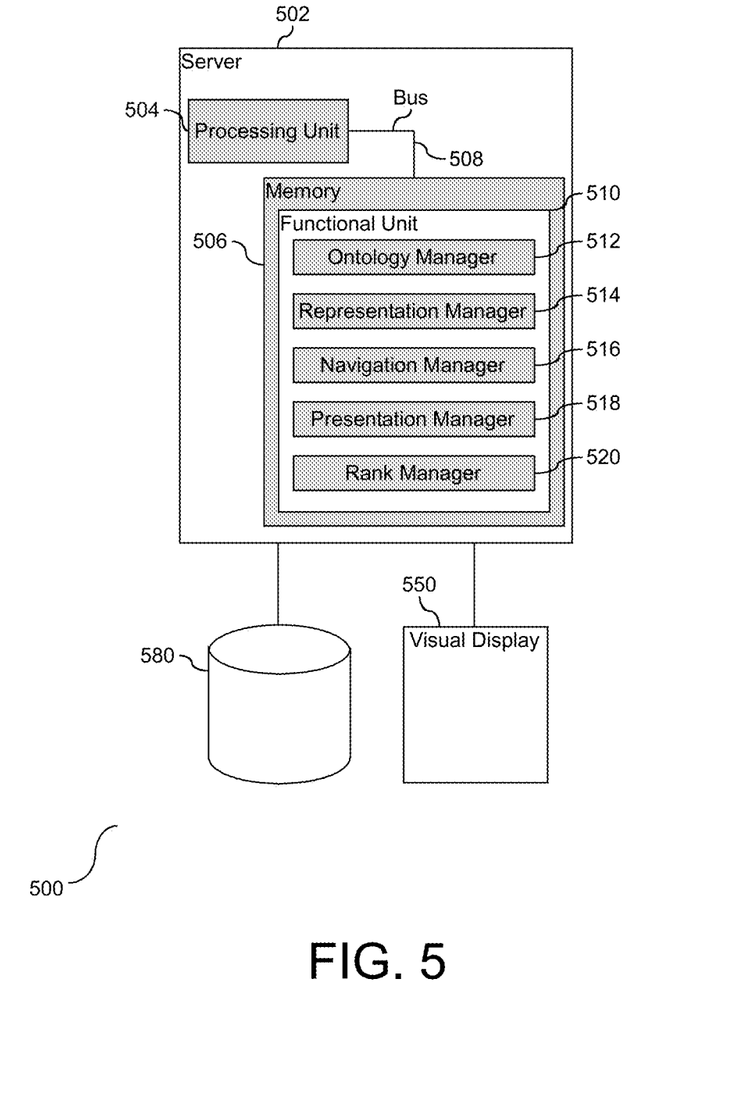
FIG. 5 depicts a block diagram of a system for displaying an ontology.

Referring now to FIG. 5 is a block diagram (500) showing a system for displaying ontology information for a select item, wherein the item may be in text or image based form. A server is provided (502) in communication with data storage (580). The server (502) includes a processing unit (504) in communication with memory (506) across a bus (508). A functional unit (510) is provided in communication with memory (506) to support the display of ontological data. As shown, the functional unit (510) is provided with tools in the form of: an ontology manager (512), a representation manager (514), a navigation manager (516), a presentation manager (518), and in one embodiment, a rank manager (520). As explained in detail below, the tools are provided to support the display of ontology information on a hierarchical path for a select item.

As shown, the ontology manager (512) is provided in communication with the processing unit (504). The ontology manager (512) extracts at least one ontology stream associated with a selected item. The ontology stream includes a set of representational elements categorized according to a relevant quality associated with the selected item. The set of representational elements in the ontology stream includes at least one element associated with the selected item. In one embodiment the ontology manager (512) derives a context associated with the selected item. The representation manager (514) is provided in communication with the ontology manager. The representation manager (514) supports the selection of at least one representational element from each extracted ontology stream. Accordingly, with the support of the ontology and representation managers (512) and (514), respectively, at least one representational element is extracted from relevant ontology streams associated with the selected item.

The navigation manager (516) is provided in communication with the representation manager (514). The navigation manager (516) supports navigation on a hierarchical path associated with each extracted ontology stream. The navigation manager (516) navigates the hierarchical path in one of at least two directions, including a direction of narrowing scope and a direction of broadening scope. In one embodiment, the navigation manger (516) changes the representational element(s) chosen by the representation manager (514) upon navigation on the hierarchical path. For example, if the navigation manager (516) navigates to a narrowing scope, the representational element(s) chosen by the representation manager (514) changes to one of correspondingly narrower scope. Similarly, if the navigation manager (516) navigates to a broadening scope, the representational element(s) chosen by the representation manager (514) changes to one of correspondingly broader scope. Accordingly, the navigation manager determines the size of scope represented by the representation manager.

The presentation manager (518) is provided in communication with the representation manager (514). The presentation manager presents the representational elements chosen by the representation manager (514). In one embodiment, the chosen elements are presented on a visual display (550) in communication with the server (502). A rank manager (520) is provided in communication with the ontology manager (512). The rank manager (520) ranks each ontology stream extracted by the ontology manager (512). In one embodiment, the ranking of the ontology streams is reflective of how closely each ontology stream is contextually related to the selected item. In another embodiment, the presentation manager (518), upon presentation, aligns the extracted ontology streams with the selected first item. The alignment includes the extracted ontology streams placed adjacent to the selected first item. In another embodiment, the presentation manager (518) presents the extracted ontology streams simultaneously, including maintaining the ontology streams on display upon navigation on one of the hierarchical paths within one of the ontology streams. For example, if one of the representative elements of one of the ontology streams is changed by the representation manager (514), the representative elements of the other ontology streams are maintained on the display in addition to the ontology stream with the changed representative element. Accordingly, the presentation manager (518) presents the ontological information extracted by the ontology manager (512).

Figure 6:
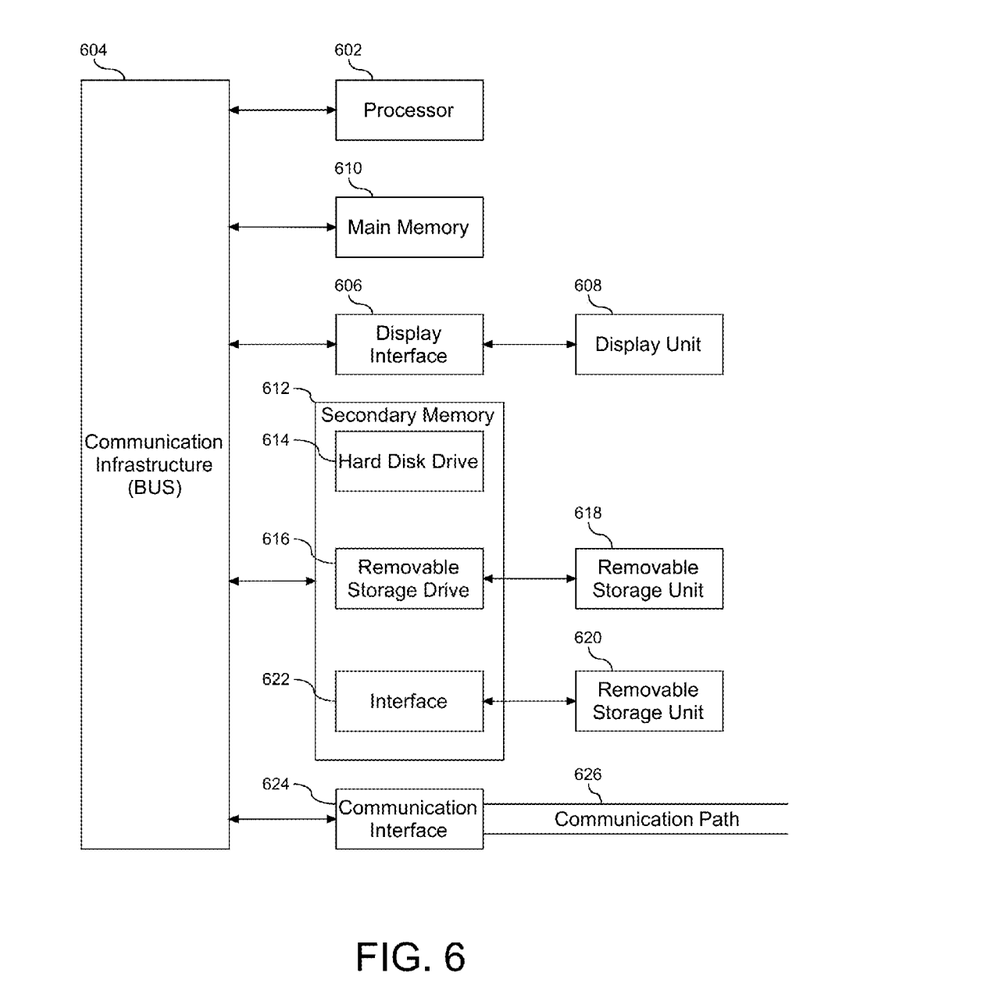
FIG. 6 depicts a block diagram showing a system for implementing an embodiment of the present invention.

Referring now to the block diagram of FIG. 6, additional details are now described with respect to implementing an embodiment of the present invention. The computer system includes one or more processors, such as a processor (602). The processor (602) is connected to a communication infrastructure (604) (e.g., a communications bus, cross-over bar, or network).

The computer system can include a display interface (606) that forwards graphics, text, and other data from the communication infrastructure (604) (or from a frame buffer not shown) for display on a display unit (608). The computer system also includes a main memory (610), preferably random access memory (RAM), and may also include a secondary memory (612). The secondary memory (612) may include, for example, a hard disk drive (614) and/or a removable storage drive (616), representing, for example, a floppy disk drive, a magnetic tape drive, or an optical disk drive. The removable storage drive (616) reads from and/or writes to a removable storage unit (618) in a manner well known to those having ordinary skill in the art. Removable storage unit (618) represents, for example, a floppy disk, a compact disc, a magnetic tape, or an optical disk, etc., which is read by and written to by removable storage drive (616). As will be appreciated, the removable storage unit (618) includes a computer readable medium having stored therein computer software and/or data.

In alternative embodiments, the secondary memory (612) may include other similar means for allowing computer programs or other instructions to be loaded into the computer system. Such means may include, for example, a removable storage unit (620) and an interface (622). Examples of such means may include a program package and package interface (such as that found in video game devices), a removable memory chip (such as an EPROM, or PROM) and associated socket, and other removable storage units (620) and interfaces (622) which allow software and data to be transferred from the removable storage unit (620) to the computer system.

The computer system may also include a communications interface (624). Communications interface (624) allows software and data to be transferred between the computer system and external devices. Examples of communications interface (624) may include a modem, a network interface (such as an Ethernet card), a communications port, or a PCMCIA slot and card, etc. Software and data transferred via communications interface (624) is in the form of signals which may be, for example, electronic, electromagnetic, optical, or other signals capable of being received by communications interface (624). These signals are provided to communications interface (624) via a communications path (i.e., channel) (626). This communications path (626) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (610) and secondary memory (612), removable storage drive (616), and a hard disk installed in hard disk drive (614).

Computer programs (also called computer control logic) are stored in main memory (610) and/or secondary memory (612). Computer programs may also be received via a communication interface (624). Such computer programs, when run, enable the computer system to perform the features of the present invention as discussed herein. In particular, the computer programs, when run, enable the processor (602) to perform the features of the computer system. Accordingly, such computer programs represent controllers of the computer system.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method comprising:
    deriving context for a selected item, the context derived from items associated with the selected item;
    assessing a proximity value for each element in an ontology associated with the selected item, the ontology defining a set of representational elements, each representational element categorized in the ontology according to a scope size of the representational element, wherein the proximity value is based on a contextual relationship the selected item shares with an associated element within the ontology, wherein the element is an image;
    ranking each element in the ontology based on the assigned proximity value;
    viewing a first element within the ontology, wherein the first element is determined to be a highest ranked element in the ontology;
    starting with the first viewed element, navigating a hierarchical path within the ontology in one of at least two directions, the directions selected from the group consisting of: an item broader in scope than the first element, and an item narrower in scope than the first element;
    viewing a second element having a scope reflective of the navigated direction;
    aligning two or more ontology streams associated with the selected item, wherein the alignment includes displaying a representative element from each ontology stream adjacent to the selected item; and simultaneously viewing the associated ontology streams, including maintaining the associated multiple ontology streams when navigating within one of the multiple ontology streams.

2. The method of claim 1, wherein the selected item is selected from the group consisting of: an image, and text.

3. The method of claim 1, further comprising ranking the ontology streams and viewing the multiple ontology streams responsive to the ranking.

4. The method of claim 3, further comprising selecting one of the ranked ontology streams for navigation.

5. A computer program product comprising:
a computer readable non-transitory storage medium having computer readable program code embodied therewith, which when executed causes a computer to:
derive context for a selected item, the computer program product to derive the context from items associated with the first selected item;
assess a proximity value for each item in an ontology associated with the selected item, the ontology defining a set of representational elements, each representational element categorized in the ontology according to a scope size of the representational element, wherein the proximity value is based on a contextual relationship the selected item shares with an associated element within the ontology, wherein the element is an image;
rank each element in the ontology based on the assigned proximity value;
display a first element within the ontology, wherein the first element is determined to be a highest ranked element in the ontology;
represent the displayed first element on a hierarchical path to be navigated in one of at least two directions, the directions selected from the group consisting of: an item broader in scope than the first element, and an item narrower in scope than the first element;
present at least one second element having a scope reflective of the navigated direction;
align two or more ontology streams associated with the selected item, wherein the alignment includes displaying a representative element from each ontology stream adjacent to the selected item; and
simultaneously display the associated ontology streams, including maintaining the associated multiple ontology streams upon navigation within one of the multiple ontology streams.

6. The computer program product of claim 5, wherein the selected item is selected from the group consisting of: an image and text.

7. The computer program product of claim 5, wherein the displayed first element has a scope reflective of the context of the selected item.

8. The computer program product of claim 5, further comprising program code to rank the ontology streams and display the multiple ontology streams responsive to the ranking.

9. The computer program product of claim 8, further comprising computer program product to receive selection of one of the ranked ontology streams for navigation.

10. A system comprising:
a processing unit to support navigation of a hierarchical path within ontological data;
a functional unit in communication with the processing unit, the functional unit having tools to support an interface representing the ontological data, the tools comprising:
an ontology manager to derive context for a selected item from items associated with the selected item and to extract at least one ontology defining a set of representational elements categorized according to a relevant quality associated with a first selected item, wherein the at least one ontology includes an element contextually associated with the selected item, wherein the element is an image;
a representation manager in communication with the ontology manager, the representation manager to support selection of at least one representational item from the at least one extracted ontology;
a navigation manager in communication with the representation manager, the navigation manager to support navigation on at least one hierarchical path within the ontology in one of at least two directions, the directions selected from the group consisting of:
an element broader in scope than the at least one representational item; and an element narrower in scope than the at least one representational item; and the navigation manger to replace the at least one selected representational element with a different representational element corresponding to the direction of navigation on the hierarchical path; and
a presentation manager in communication with the representation manager, the presentation manager to present the at least one representational element selected by the representation manager;
the presentation manager to align two or more ontology streams associated with the selected first item upon presentation, wherein the alignment includes the presentation manager to present the representative element from each ontology stream adjacent to the selected item; and
the presentation manager to present the extracted ontology streams simultaneously, including the presentation manager to maintain two of the ontology streams upon navigation on one of the hierarchical paths within one of the at least two ontology streams.

11. The system of claim 10, wherein the selected item is selected from the group consisting of: an image and text.

12. The system of claim 10, further comprising the ontology manager to determine context of the selected item and the representation manager to choose at least one representational element with a scope reflective of the determined context.

13. The system of claim 10, further comprising the selected item associated with multiple ontology streams, and a rank manager in communication with the ontology manager, the rank manager to rank an extracted ontology stream and the presentation manager to present at least two of the ontology streams responsive to the ranking.

* * * * *